United States Patent
Aspas Puertolas et al.

(10) Patent No.: US 10,498,125 B2
(45) Date of Patent: Dec. 3, 2019

(54) WIND TURBINE AND DEVICE FOR PROTECTING FROM LIGHTNING

(71) Applicant: Airbus Safran Launchers SAS, Paris (FR)

(72) Inventors: Jesus Aspas Puertolas, Paris (FR); Damien Coudeyre, Bordeaux (FR); Sylvie Fargeot, Bordeaux (FR); Alexandre Sellier, Raillicourt (FR); André De Lustrac, Sceaux (FR); Gérard Pascal Piau, Courgent (FR)

(73) Assignee: ARIANEGROUP SAS, Paris (FR)

( * ) Notice: Subject to any disclaimer, the term of this patent is extended or adjusted under 35 U.S.C. 154(b) by 337 days.

(21) Appl. No.: 15/327,709

(22) PCT Filed: Jul. 24, 2015

(86) PCT No.: PCT/EP2015/067060
§ 371 (c)(1),
(2) Date: Jan. 20, 2017

(87) PCT Pub. No.: WO2016/012614
PCT Pub. Date: Jan. 28, 2016

(65) Prior Publication Data
US 2017/0214232 A1    Jul. 27, 2017

(30) Foreign Application Priority Data
Jul. 25, 2014 (FR) ...................................... 14 57223

(51) Int. Cl.
*H02G 13/00* (2006.01)
*B64D 45/02* (2006.01)
*F03D 80/30* (2016.01)

(52) U.S. Cl.
CPC ............. *H02G 13/40* (2013.01); *B64D 45/02* (2013.01); *F03D 80/30* (2016.05); *H02G 13/00* (2013.01); *Y02E 10/72* (2013.01)

(58) Field of Classification Search
CPC .......... H01Q 17/00; H01Q 17/06; H01Q 1/48; H01Q 1/282; H01Q 1/288; H01Q 15/00;
(Continued)

(56) References Cited

U.S. PATENT DOCUMENTS 5,323,636 A * 6/1994 McGowan ........... G01N 29/022
310/313 R
7,120,004 B2 * 10/2006 Hall ........................ B64D 45/02
361/218

(Continued)

FOREIGN PATENT DOCUMENTS

| FR | 2 995 734 A1 | 3/2014 |
| WO | 2005/071788 A2 | 8/2005 |
| WO | 2013/097855 A2 | 7/2013 |

OTHER PUBLICATIONS

French Search Report issued in Patent Application No. FR 1457223 dated Apr. 24, 2015.
(Continued)

*Primary Examiner* — Tuan T Dinh
(74) *Attorney, Agent, or Firm* — Pearne & Gordon LLP

(57) ABSTRACT

A device for protecting from lightning (30) is intended to form at least a portion of an external surface of a structure to be protected and comprises a ground plane (32), a dielectric substrate (34) arranged on the ground plane, and an array of first metal elements (36) arranged on the dielectric substrate (34) and extending substantially parallel to the ground plane (32) in such a way that any pair of consecutive elements from said first metal elements (36) is separated by a distance comprised between 0.01 millimetres and 10 millimetres, said first metal elements being distributed in
(Continued)

juxtaposed similar patterns, each of said patterns including first metal elements of different dimensions corresponding respectively to different electromagnetic resonant frequencies the juxtaposition of which defines an electromagnetic absorption band of the pattern.

8 Claims, 5 Drawing Sheets

(58) Field of Classification Search
CPC .. H01Q 15/006; H01Q 15/0086; H01Q 19/10; H01Q 19/30; F01D 25/00; F03D 11/00; H02H 1/00; H05F 3/00; H02G 13/00
USPC ........ 342/1–10; 343/700 MS, 819, 843, 834, 343/891, 909; 361/218–220, 117; 416/146 R, 241, 224, 230
See application file for complete search history.

(56) References Cited

U.S. PATENT DOCUMENTS

| | | | |
|---|---|---|---|
| 7,804,439 B2* | 9/2010 | Yoshida | H05K 9/0003 342/1 |
| 8,013,777 B2* | 9/2011 | Sim | H01Q 17/00 342/1 |
| 8,164,506 B2* | 4/2012 | Sim | H01Q 17/008 342/1 |
| 9,506,349 B2* | 11/2016 | Appleton | F03D 1/0633 |
| 9,761,953 B2* | 9/2017 | De Lustrac | H01Q 17/00 |
| 2004/0140945 A1* | 7/2004 | Werner | H01Q 15/0086 343/909 |
| 2004/0201526 A1* | 10/2004 | Knowles | H01Q 1/38 343/700 MS |
| 2010/0143134 A1* | 6/2010 | Hiremath | F03D 1/0675 416/146 R |
| 2010/0263898 A1 | 10/2010 | Hebert | |
| 2011/0175672 A1* | 7/2011 | Nguyen | G02B 1/002 327/534 |
| 2012/0141277 A1* | 6/2012 | Yarbrough | F03D 80/30 416/146 R |
| 2013/0294925 A1* | 11/2013 | Appleton | B29C 70/086 416/241 R |
| 2013/0314765 A1* | 11/2013 | Padilla | G01K 7/003 359/315 |
| 2014/0118177 A1* | 5/2014 | Appleton | F03D 1/0675 342/1 |
| 2015/0229031 A1 | 8/2015 | De Lustrac et al. | |

OTHER PUBLICATIONS

International Search Report issued in Patent Application No. PCT/EP2015/067060 dated Oct. 23, 2015.
Written Opinion issued in Patent Application No. PCT/EP2015/067060 dated Oct. 23, 2015.

* cited by examiner

WIND TURBINE AND DEVICE FOR PROTECTING FROM LIGHTNING

TECHNICAL DOMAIN

This invention relates to the domain of structures exposed to lightning and more particularly relates to a device for protecting such a structure against lightning.

The invention relates particularly to a wind turbine and to an aircraft fitted with such a device for protection against lightning.

Nevertheless, the device for protection against lightning can be used to protect any other type of structure that might be exposed to lightning.

STATE OF PRIOR ART

Blades of wind turbines with "medium" dimensions, in other words with a length of between approximately 10 metres and 60 metres, are usually made from a composite material structure based on glass fibres.

Protection of a blade of a wind turbine of this type against lightning is conventionally based on a system comprising metal lightning receptors flush with the external surface of the blade and distributed along the blade, being connected to an electrically conducting down cable extending inside the blade along the internal structural member in the blade and connected to earthing means integrated into the hub of the wind turbine rotor.

Thus, lightning preferably strikes lightning receptors and is directed by the down cable as far as the earthing means.

However, technical progress on wind turbines tends to favour the use of large wind turbines, with blade lengths that can exceed 80 metres.

These wind turbines form tall structures, typically more than 200 metres high, for which it is known that lightning is principally rising, in other words originating from precursors travelling from the structure towards the cloud.

Furthermore, to guarantee the mechanical behaviour of the blades of such wind turbines, the structure of these blades includes composite materials based on carbon fibres, appreciated for their mechanical properties that are better than glass fibres.

However, in particular, the electrical conductivity of carbon fibres is much higher than that of glass fibres. The electrical conductivity of a composite material based on carbon fibres is however considerably lower than that of a metal material, and in any case is too low for the material to be capable of dispersing the electrical current induced by a lighting impact without the structure being damaged beyond an acceptable level.

As a result, there is a risk of competition between lighting receptors and regions of the blade containing carbon fibres, and a risk of an electric arc inside the blade between regions with carbon fibres and the down cable. Such an electric arc inside the blade can cause an explosion of the blade.

Furthermore, the blades of wind turbines disturb RADAR beams used by civil and military RADAR systems to the extent that they hinder operation of these systems. Therefore it is desirable to reduce the RADAR signature of wind turbine blades.

PRESENTATION OF THE INVENTION

The main purpose of the invention is to provide a simple, economic and efficient solution to these problems.

To achieve this, the invention proposes a lightning protection device designed to form at least a portion of an external surface of a structure to be protected, comprising a ground plane, a dielectric substrate arranged on the ground plane, and an array of first metal elements arranged on the dielectric substrate and extending substantially parallel to the ground plane in such a way that any pair of consecutive elements from said first metal elements is separated by a distance equal to between 0.01 millimetres and 10 millimetres, said first metal elements being distributed in juxtaposed similar patterns, each of said patterns including first metal elements with different dimensions each corresponding to different electromagnetic resonant frequencies, the juxtaposition of which defines an electromagnetic absorption band of the pattern.

The device for protection against lightning according to the invention enables lighting to slip from one metal element to the next, particularly due to the small spaces between these first metal elements. Lightning can thus be deviated as far as an appropriate receptor device, without damaging the structure to be protected.

The configuration of the lightning protection device also provides electromagnetic wave absorption properties in a frequency band determined by the dimensions of the first metal elements. These dimensions are preferably chosen to enable the absorption of RADAR waves, typically around 5.6 GHz.

The lighting protection device can thus reduce the RADAR signature of the structure to be protected.

These electromagnetic absorption properties are obtained using elements formed at the outside surface of the structure to be protected, as will become clearer in the following. Consequently, these elements do not introduce any risk of an electric arc within the structure to be protected.

Preferably, every pair of consecutive elements among said first metal elements of a same pattern is separated by a distance between 0.3 millimetres and 3 millimetres.

Preferably, the device also includes a metal grid formed from interlacing of metal strips formed on the dielectric substrate between said first metal elements.

Such a metal grid forms a preferred attachment element for lightning and can limit risks of damage to the first metal elements by lightning.

Said metal tracks preferably extend between said patterns. The metal tracks thus extend in the same plane as the first metal elements.

In one preferred embodiment of the invention, the ground plane is formed from a continuous metal grating. "Continuous" means that strands of the grating are uninterrupted from one end of the ground plane to the other.

In another embodiment of the invention, the ground plane is formed from a set of grating portions at equal spacings from each other. The nature of the ground plane is thus discontinuous.

In yet another embodiment of the invention, the ground plane is composed of a plurality of second metal elements at equal spacings from each other. The nature of the ground plane is discontinuous in this case also.

Experiments have shown that the use of a discontinuous ground plane can reduce damage to the structure of the blade at the lightning impact point.

The invention also applies to a wind turbine blade comprising an aerodynamic external skin integrating at least one device of the type described above, of which said ground plane is located on an inner side of the blade while said set of first metal elements is located on an outer side of the blade.

The blade preferably comprises each connection means, and the metal grid can advantageously be connected to the earth connection means.

If the ground plane is formed from a continuous metal grating, it is preferably also connected to the earth connection means.

On the other hand, when the ground plane is discontinuous, it is preferably not connected to the earth connection means given that, in principle, the ground plane does not participate in the conduction of lightning.

The invention also relates to a wind turbine comprising at least one blade of the type described above.

The earth connection means are earthed if applicable.

The invention also applies to an aircraft comprising an aerodynamic external skin integrating at least one device of the type described above, of which said ground plane is located on an inner side of the aircraft while said set of first metal elements is located on an outer side of said aircraft.

Preferably, said device connects at least two regions of the external skin of the aircraft forming preferred entry and exit points for lightning.

BRIEF DESCRIPTION OF THE DRAWINGS

The invention will be better understood and other details, advantages and characteristics will become clear after reading the following description given as a non-limitative example with reference to the appended drawings among which.

In all these figures, identical references can designate identical or similar elements.

DETAILED PRESENTATION OF PREFERRED EMBODIMENTS

Figure 1:
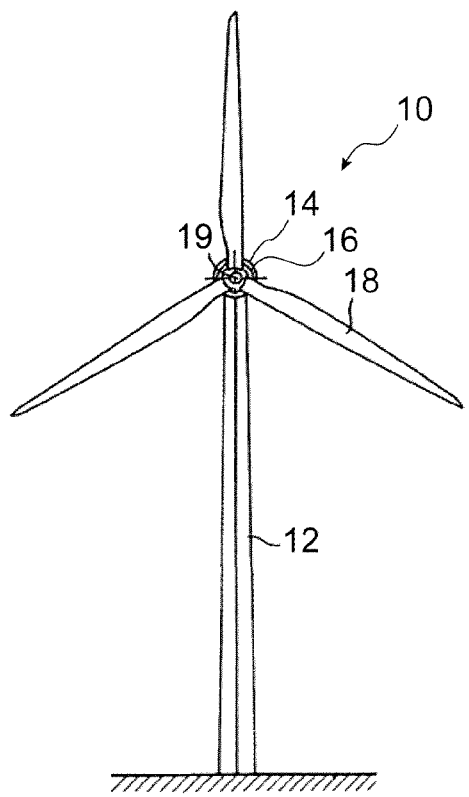
FIG. 1 is a diagrammatic view of a wind turbine according to a preferred embodiment of the invention.

FIG. 1 illustrates a wind turbine 10 generally comprising a pole 12, a nacelle 14 supported by the pole and housing a rotor 16 supporting blades 18 and mounted free to rotate about a rotor axis 19. Each blade 18 comprises a base, for example cylindrical in shape, connected to the rotor hub 16, and prolonging a slender aerodynamic profile, in a well-known manner.

Figure 2:
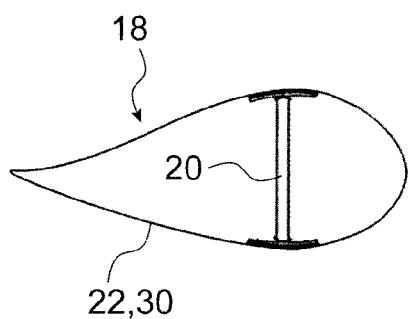
FIG. 2 is a diagrammatic cross-sectional view of a blade of the wind turbine shown in FIG. 1.
Figure 3:
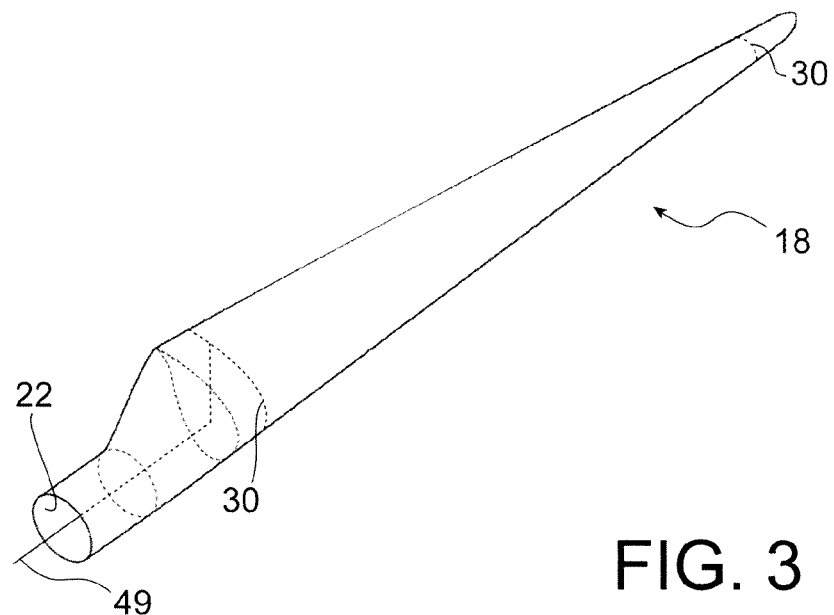
FIG. 3 is a diagrammatic perspective view of the blade shown in FIG. 2.

FIGS. 2 and 3 illustrate the general outlines of a blade 18 of a wind turbine 10, in cross-sectional and perspective views respectively. The blade 18 is generally in the form of a structural member 20 and an aerodynamic external skin 22 fixed to the structural member 20 (FIG. 2). Obviously, the structural member 20 can be made as a single piece or can be formed from several sections assembled end to end. Furthermore, the invention is not limited to a blade comprising a single structural member. Thus, the blade 18 may include several, for example two, parallel structural members.

Figure 4:
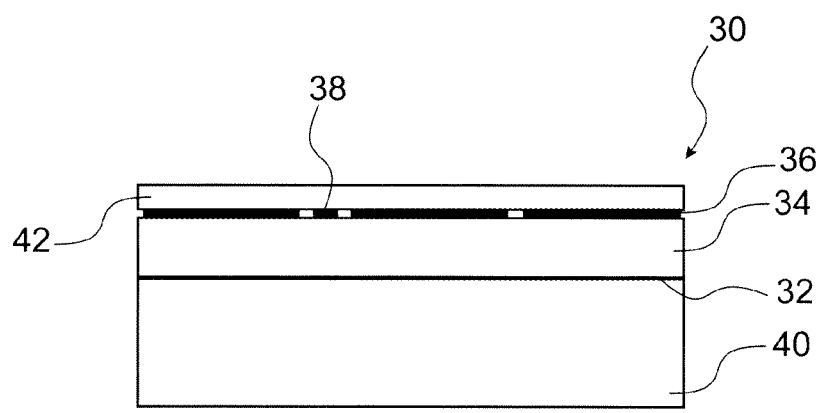
FIG. 4 is a partial diagrammatic sectional view of a lightning protection device integrated into the external skin of the blade in FIG. 2.

The outer skin 22 of the blade includes a lightning protection device 30, formed from a stack that can be seen on FIG. 4, including a ground plane 32, a dielectric substrate 34 placed on the ground plane 32, and a set of first metal elements 36 and a metal grid 38 placed on the dielectric substrate. The ground plane 32 is located at the inner side of the blade 22 while all the first metal elements 36 are located at the outer side of the blade.

Figure 5:
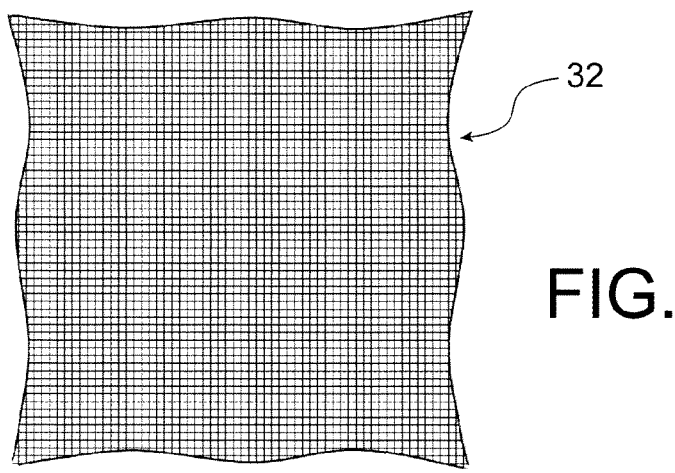
FIG. 5 is a partial diagrammatic top view of a ground plane belonging to the device in FIG. 4.

In the example illustrated, the ground plane 32 is in the form of a grating made from a metal material such as copper, and extending continuously in a known manner as shown on FIG. 5. The dimension of the meshes of this grating are preferably less than 3 mm. The fact that the ground plane 32 is this fine makes reflection of electromagnetic radiation with a frequency of less than about 10 GHz possible.

As a variant, the ground plane 32 may be formed from a sheet of expanded metal.

The surface density of the grating or expanded metal sheet forming the ground plane 32 may for example be about 80 $g/m^2$.

In the example illustrated on FIG. 5, the ground plane 32 is continuous.

Figure 6:
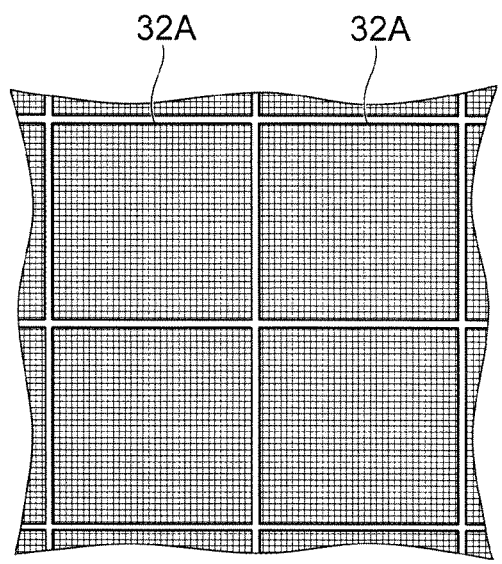
FIGS. 6 and 7 are views similar to FIG. 5 illustrating variants of the ground plane.

As a variant, this ground plane may be discontinuous. In this case, the ground plane 32 may be formed from a set of grating portions 32A, for example square or rectangular in shape, at a uniform spacing from each other, as shown on FIG. 6.

Figure 7:
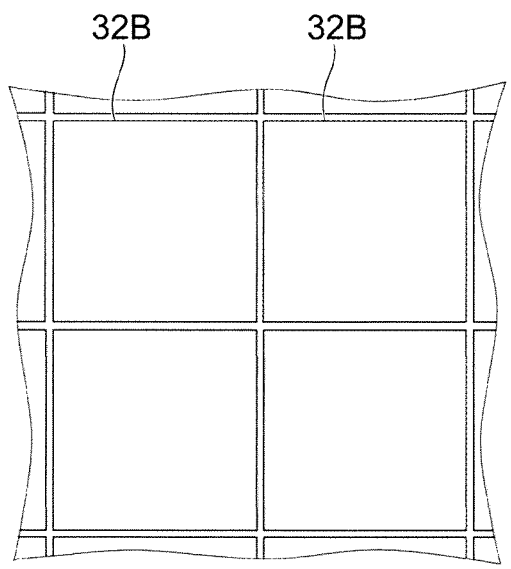

In another variant, the discontinuous ground plane may be formed from a plurality of second metal elements 32B, for example square or rectangular in shape, at uniform spacing, as shown on FIG. 7.

If the ground plane is discontinuous, the ground plane preferably has a shape complementary to the shape of the metal grid 38, in other words the shape of each of the grating portions 32A or each of the second metal elements 32B corresponds to the space delimited by a mesh of the metal grid 38.

As another variant, the ground plane may be composed of a layer of composite Carbon Fibre Reinforced Plastic (CFRP) material. The lightning protection device can thus may good use of the electrical conducting properties of carbon fibres possibly included in the outer skin 22 of the turbine blade, particularly when the wind turbine considered includes large blades, in other words more than 60 metres long.

In all cases, the ground plane is provided with a structure in which openings are formed to allow resin to diffuse through the structure, which is advantageous for fabrication of the protection device 30 and the part on which this device is located, as will become clearer from the following description.

Furthermore, the dielectric substrate 34 may for example be composed of a layer of composite glass fibre reinforced plastic (GFRP) material, for example with a thickness equal to about 1 mm. For example, the matrix of the composite material may be composed of epoxy resin.

Moreover, the external skin 22 of the blade preferably comprises a relatively thick layer of composite material 40, for example glass fibre or carbon fibre reinforced plastic on which the lighting protection layer 30 is placed.

Finally, the lightning protection device 30 is advantageously covered with a protective coating such as a coat of paint 42, for example with a thickness of about 300 μm. This paint coat is preferably provided with openings (not shown on FIG. 3) leaving some of the first metal elements 36 exposed so as to improve lighting attachment on these metal elements.

For example, the first metal elements 36 are made of copper and for example they are in the form of relatively thin platelets, with a thickness preferably equal to between 15 µm and 70 µm, and for example equal to 35 µm. Each metal element 36 may have an arbitrary shape, for example polygonal or circular, and is preferably rectangular or square.

As shown in FIG. 7, the first metal elements 36 are arranged in the form of similar approximately square patterns 44, each pattern extending in the space corresponding to a mesh of the metal grid 38 and being centred in said space. In other words, the metal grid 38 is formed by interlacing of metal tracks 46 and 48 arranged on the dielectric substrate and routed between the patterns 44 formed by the first metal elements 36. For example, the width of each of the metal tracks 46 and 48 may be about 1 mm.

Each metal element 36 is at a spacing from each of its neighbours equal to a distance of between 0.01 mm and 10 mm, as will become clearer in the following. This distance appeared to be optimal for lightning to slip from one of the first metal elements 36 to the next. Lightning can thus be transferred as far as an appropriate receptor device, without damaging the external skin 22 of the blade.

In the example illustrated on the figures, the metal grid 38 is electrically connected to an earth connection device integrated into the rotor hub 16 and to the wind turbine pole 12 (this earth connection device not being visible on the figures). For example, the metal grill 38 may be connected to the earth connection device by a down cable 49 located in the base of the blade (FIG. 3).

Furthermore, first metal elements 36 located at one end of the blade lightning protection device 30 facing the rotor hub 16 are also electrically connected to the earth connection device. The earth connection device thus forms the above-mentioned receptor device through which lightning can be carried to the earth.

Preferably, the ground plane 32 is also connected to the earth connection device, for example through the down cable 49.

Thus, when lightning strikes the protection device 30, several electric current passage channels can be used, firstly within the metal grid 38 and secondly from one metal element 36 to the next among the first metal elements, as far as the earth connection device. Instead of penetrating into the outer skin 22 of the blade, lightning slides on the protection device 30 until it reaches the earth connection device. The risk of damage to the outer skin 22 is thus reduced. Furthermore, the protection device 30 does not include any electrical conducting element inside the blade, which prevents risks of electric arcs as with wind turbine blades of prior art.

Furthermore, due to its structure, the lightning protection device 30 provides an effect by which electromagnetic waves are absorbed in a determined frequency band.

Each metal element 36 acts like a passive polar antenna.

Thus, a metal element with a rectangular shape has an electromagnetic resonant frequency $f_r$ that, as a first order approximation, is approximately equal to:

$$f_r = \frac{c_0}{2\sqrt{L^2 + W^2}\sqrt{\mu_r \varepsilon_r}}$$

in which:
$f_r$ is the zero order resonant frequency of the metal element 36,
$c_0$ is the speed of light in vacuum,
L is the length of the metal element 36,
W is the width of the metal element 36,
$\mu_r$ is the relative permeability of the dielectric substrate 34,
$\varepsilon_r$ is the relative permittivity of the dielectric substrate 34.

According to one principle of the invention, each of the patterns 44 formed by the first metal elements 36 comprises first metal elements with different dimensions each corresponding to a different electromagnetic resonant frequency. The set of these resonant frequencies defines of widened electromagnetic absorption band of the pattern.

Figure 8:
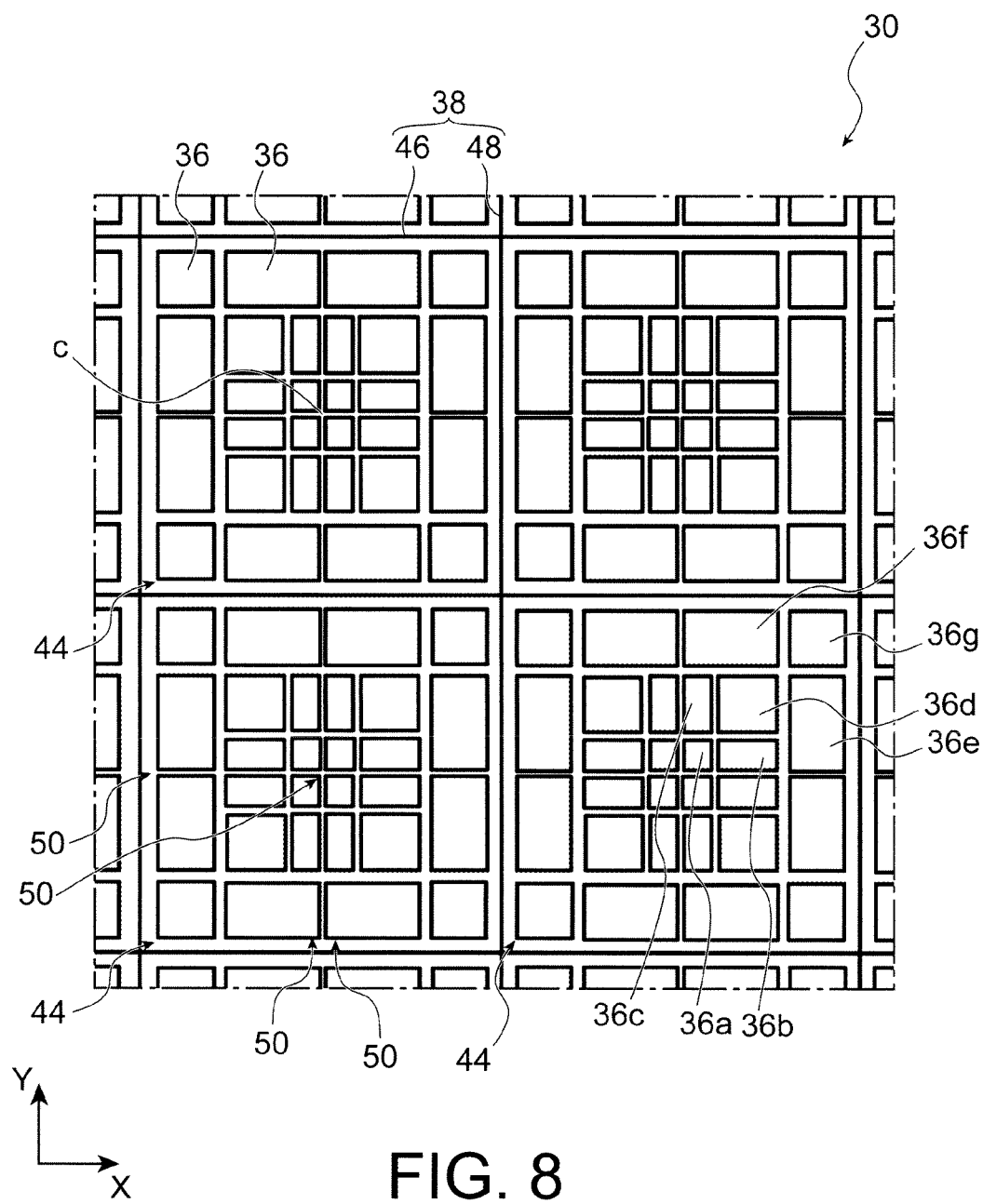
FIG. 8 is a partial diagrammatic top view of the device in FIG. 4.

In the particularly efficient example illustrated on FIG. 8, each pattern 44 is generally square and is composed of four elementary sub-patterns 50 distributed uniformly around a centre C of the pattern 44, such that the pattern 44 is symmetric about said centre. Each elementary sub-pattern 50 is thus similar to the other elementary sub-patterns and is the result of a 90° rotation of each of the two elementary sub-patterns adjacent to it within the pattern 44.

In each pattern 44, one of the elementary sub-patterns 50 comprises seven metal elements arranged as follows, with reference to the X and Y directions in FIG. 8:

a first metal element 36a, with a square shape, located in the corner of the elementary sub-pattern close to the centre of the pattern 44, the side length of which is equal to 5.25 mm;

a second metal element 36b, with a rectangular shape, extending adjacent to the first metal element 36a towards increasing X dimensions, at a spacing from the first element equal to 0.6 mm along the X direction, with an extent 10.55 mm along the X direction and 5.25 mm along the Y direction;

a third metal element 36c, with a rectangular shape, extending adjacent to the first metal element 36a towards increasing Y dimensions, at a spacing from the first element equal to 0.6 mm along the Y direction, with an extent 5.25 mm along the X direction and 10.55 mm along the Y direction;

a fourth metal element 36d, with a square shape extending adjacent to the second metal element 36b towards increasing Y dimensions, at a spacing from the second metal element equal to 0.6 mm along the Y direction, and extending adjacent to the third metal element 36c towards increasing X dimensions, at a spacing from the third metal element equal to 0.6 mm along the X direction, the side length of which is equal to 10.55 mm;

a fifth metal element 36e, with a rectangular shape, extending adjacent to the second metal element 36b and to the fourth metal element 36d towards increasing X dimensions, at a spacing from these elements equal to 2.4 mm along the X direction, with an extent 10.60 mm along the X direction and 15.83 mm along the Y direction;

a sixth metal element 36f, with a rectangular shape, extending adjacent to the third metal element 36c and to the fourth metal element 36d towards increasing Y dimensions, at a spacing from these elements equal to 2.4 mm along the Y direction, with an extent 15.83 mm along the X direction and 10.60 mm along the Y direction;

a seventh metal element 36g, with a square shape extending adjacent to the fifth metal element 36e towards increasing Y dimensions, at a spacing from the fifth metal element equal to 2.4 mm along the Y direction, and extending adjacent to the sixth metal element 36f towards increasing X dimensions, at a spacing from the sixth metal element equal to 2.4 mm along the X direction, the side length of which is equal to 10.60 mm;

Furthermore, the fourth metal element 36d and the seventh metal element 36g are at a spacing from the closest track 48 forming part of the metal grid 38 and parallel to the Y direction by a distance equal to 2.4 mm. Similarly, the sixth metal element 36f and the seventh metal element 36g are at a spacing from the closest track 46 forming part of the metal grid 38 and parallel to the X direction by a distance equal to 2.4 mm.

The other three elementary sub-patterns 50 of the pattern 44 are deduced from the elementary sub-pattern described above by successive 90 rotations in the anti-clockwise direction.

The first metal elements 36a, 36b and 36e of each elementary sub-pattern are separated from the first adjacent metal elements 36a, 36d and 36f of another elementary sub-pattern by a distance equal to 0.6 mm.

The layout of the first metal elements 36 described above can for example result in an attenuation of more than 20 dB in the electromagnetic waves in a frequency band centred on a frequency of about 5.7 GHz and with a width of about 1 GHz.

The wind turbine blade 18 can be made using a method including steps consisting of:

successively stacking fibres of the dielectric substrate 34, the ground plane 32, and fibres of the composite material layer 40, on the set of first metal elements 36 and the metal grid 38, and then infuse the resin through the assembly thus formed, and then polymerise the resin so as to solidify the assembly, then apply finish coats (typically paint) on the assembly thus formed.

The perforated nature of the ground plane thus contributes to making the protection device 32 jointly with the layer of composite material 40 on which the device is placed, in a particularly simple manner.

Figure 9:
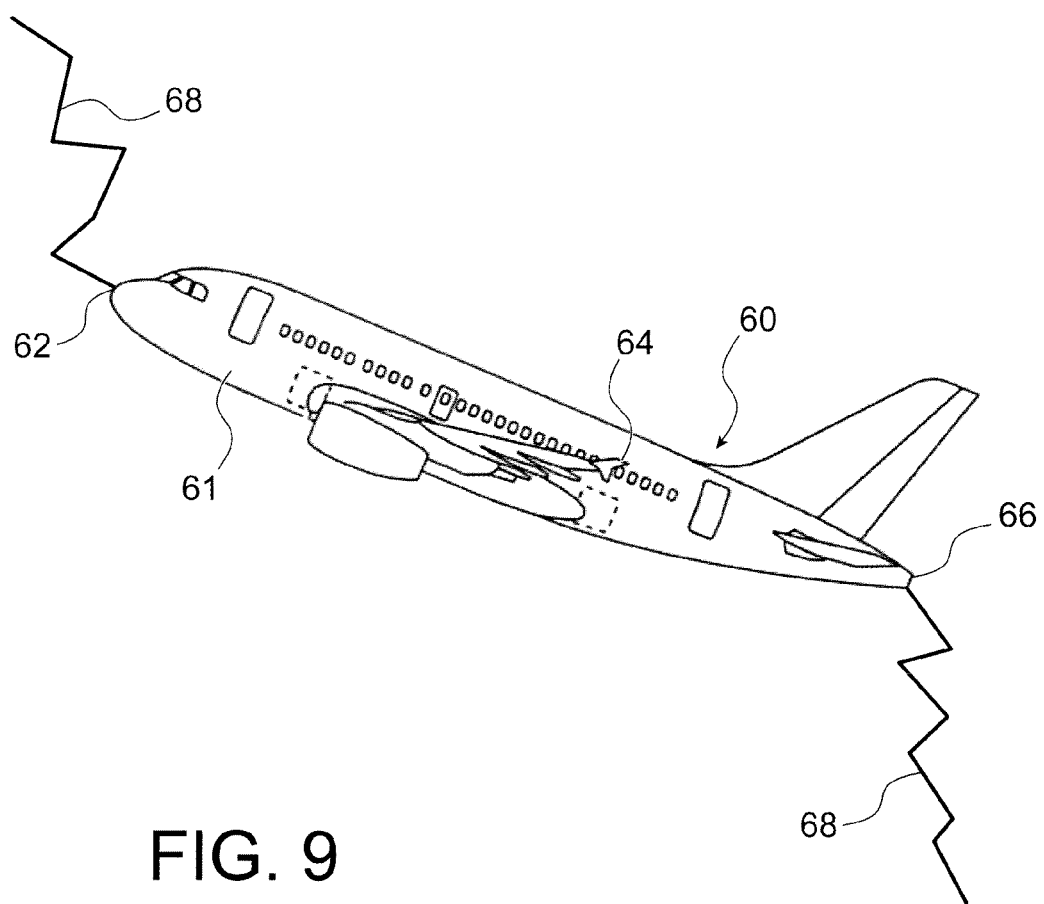
FIG. 9 is a diagrammatic view of an aircraft according to a preferred embodiment of the invention.

FIG. 9 illustrates an aircraft 60 for which the outside skin of the fuselage and the wing is covered with a lightning protection device 61 similar to the device mentioned above. In particular, this device extends from the aircraft nose 62 to the tips 64 of the wings and to the aft tip 66 of the aircraft. These zones form preferred entry and exit points for lightning. In the same way as described above for the wind turbine 10, the ground plane 32 is located inside the aircraft 60 while all the first metal elements 36 are located on the outside of the aircraft 60.

The lightning protection device 61 enables lightning 68 to slide on the first metal elements of the device from one element to the next, from a preferred entry point such as the nose 62 of the aircraft to a preferred exit point such as the aft tip 66 of the aircraft, without damaging the structure of the aircraft, while reducing the RADAR signature of the aircraft.

What is claimed is:

1. A wind turbine comprising:
    a rotor hub;
    at least one blade supported by the rotor hub; and
    an earth connection device through which lightning can be carried to the earth,
    wherein the blade comprises an aerodynamic external skin,
    wherein said aerodynamic external skin integrates at least one lightning protection device, and wherein said lightning protection device comprises;
    a ground plane located on an inner side of the blade,
    a dielectric substrate arranged on the ground plane, and
    set of first metal elements arranged on the dielectric substrate and located on an outer side of the blade,
    wherein the set of first metal elements extends substantially parallel to the ground plane in such a way that any pair of consecutive elements of said set of first metal elements is separated by a distance of between 0.01 millimeters and 10 millimeters, said first metal elements being distributed in juxtaposed similar patterns, each of said patterns including first metal elements with different dimensions corresponding to different electromagnetic resonant frequencies, the juxtaposition of which defines an electromagnetic absorption band of the pattern, and wherein first metal elements of said set of first metal elements located at one end of the lightning protection device facing the rotor hub are electrically connected to the earth connection device, and
    said lighting protection device further comprising a metal grid formed from interlacing of metal strips formed on the dielectric substrate between first metal elements of said set of first metal elements.

2. The wind turbine according to claim 1, in which every pair of consecutive elements among said first metal elements of a same pattern is separated by a distance between 0.3 millimeters and 3 millimeters.

3. The wind turbine according to claim 1, in which said metal strips extend between said patterns.

4. The wind turbine according to claim 1, in which the ground plane is formed from a continuous metal grating.

5. The wind turbine according to claim 1, in which the ground plane is formed from a set of grating portions at a uniform spacing from each other.

6. The wind turbine according to claim 1, in which the ground plane is formed from a plurality of second metal elements at equal spacing from each other.

7. The wind turbine according to claim 1, wherein the metal grid is connected to the earth connection device.

8. The wind turbine according to claim 4, wherein the metal grating forming the ground plane is connected to the earth connection device.

\* \* \* \* \*

UNITED STATES PATENT AND TRADEMARK OFFICE
CERTIFICATE OF CORRECTION

PATENT NO. : 10,498,125 B2
APPLICATION NO. : 15/327709
DATED : December 3, 2019
INVENTOR(S) : Jesus Aspas Puertolas et al.

Page 1 of 1

It is certified that error appears in the above-identified patent and that said Letters Patent is hereby corrected as shown below:

In the Specification

Column 3, Line 1, "each connection means," should read -- earth connection means, --

Signed and Sealed this
Thirteenth Day of October, 2020

Andrei Iancu
*Director of the United States Patent and Trademark Office*